United States Patent [19]

Yoshioka et al.

[11] Patent Number: 4,950,726
[45] Date of Patent: Aug. 21, 1990

[54] ORGANOPOLYSILOXANE COMPOUND HAVING LIQUID-CRYSTALLINE PHASE

[75] Inventors: Hiroshi Yoshioka, Tokyo, Japan; Yoshitaka Hamada, Madison, Wis.; Masanao Kamei, Annaka, Japan

[73] Assignee: Shin-Etsu Chemical Co., Ltd., Tokyo, Japan

[21] Appl. No.: 416,341

[22] Filed: Oct. 3, 1989

[30] Foreign Application Priority Data

Oct. 24, 1988 [JP] Japan ................................. 63-267674

[51] Int. Cl.$^5$ .............................................. C08G 77/04
[52] U.S. Cl. ...................................... 528/25; 556/479; 556/450; 556/453; 556/457; 528/26; 528/27; 528/43; 528/31; 528/15
[58] Field of Search ........................ 528/25, 26, 27, 43, 528/31, 15; 556/479, 450, 453, 457

[56] References Cited

U.S. PATENT DOCUMENTS 4,358,391 11/1982 Finkelmann et al. ................ 528/29
4,388,453 6/1983 Finkelmann et al. ................ 528/29

Primary Examiner—Melvyn I. Marquis
Assistant Examiner—Karen A. Hellender
Attorney, Agent, or Firm—Wyatt, Gerber, Burke and Badie

[57] ABSTRACT

A novel organopolysiloxane compound is disclosed which is capable of being cured by crosslinking and exhibiting a liquid-crystalline phase even in a cross-linked condition. The organopolysiloxane has mesogenic groups bonded to the silicon atoms such as $-(CH_2)_3O-Pn-CO-O-Pn-CN$; $-(CH_2)_3O-(CH_2)_3-O-Pn-CO-O-Pn-CN$; $-(CH_2)_3O-Pn-CO-O-Pn-F$; and $-(CH_2)_3O-Pn-CO-O-Pn-O-CH_3$, in which the symbol Pn denotes a 1,4-phenylene group, and hydrolyzable groups pertaining to the crosslinking reaction.

4 Claims, 3 Drawing Sheets

ORGANOPOLYSILOXANE COMPOUND HAVING LIQUID-CRYSTALLINE PHASE

BACKGROUND OF THE INVENTION

The present invention relates to a novel organopolysiloxane compound or, more particularly, to an organopolysiloxane compound capable of exhibiting a liquid-crystalline phase in a crosslinked condition so as to be useful as a material for a display unit in electronic instruments or as a material of temperature sensor.

As is well known, a liquid crystal is a material simultaneously having electrical or optical anisotropy inherent in solids and fluidity inherent in liquids and is used as a material for optoelectronic devices or display units, material of temperature sensors, filling material of columns and the like.

Known liquid-crystal materials used in these applications include low-molecular as well as high-polymeric compounds. The high-polymeric liquid-crystal materials include main chain-type all-aromatic polyesters and side chain-type polyacrylic and polymethacrylic esters and polysiloxanes, of which those of the polysiloxane type are preferred in respect to their excellent low-temperature characteristics and weatherability.

The polysiloxane-type liquid-crystalline materials known in the prior art are mostly a liquid organopolysiloxane having a linear molecular structure to which mesogen residues are grafted. Besides, Japanese Patent Kokai No. 58-17119 discloses a linear organopolysiloxane having a crosslinkable structure by which the compound is crosslinked to lose fluidity but still retains a liquid-crystalline phase. In an example disclosed in this patent document, a mixture composed of an organohydrogenpolysiloxane, vinyl-substituted mesogen compound and organopolysiloxane having a silicon-bonded vinyl group at each molecular chain end as a crosslinking agent is subjected to the addition reaction between the silicon-bonded hydrogen atoms and the silicon-bonded vinyl groups so as to simultaneously effect the grafting reaction of the mesogen molecules and the crosslinking reaction of the organopolysiloxane so that the reaction product is a crosslinked organopolysiloxane capable of exhibiting a liquid-crystalline phase. The liquid-crystalline material of this type has several disadvantages. The degree of crosslinking cannot be sufficiently high because the cross-linking agent is difunctional, that the material is not stable even in a sealed condition when a catalyst for the crosslinking reaction is admixed therewith and that the crosslinking reaction cannot proceed at a practical velocity unless the composition is heated.

Alternatively, Japanese Patent Kokai Nos. 58-17119 and 62-30123 propose a compound, which is non-liquid but liquid-crystalline, obtained by the crosslinking reaction of a silane or a mixture of silanes represented by the general formula $R_mSiR'_{4-m}$, in which R is a mesogen residue, R' is a group capable of pertaining to the condensation reaction and m is zero, 1, 2 or 3, in the presence of a condensation catalyst. This organopolysiloxane, however, cannot exhibit the low-temperature characteristics inherent in the siloxane linkages because of the relatively small content of the linear segments in the molecules of this compound.

SUMMARY OF THE INVENTION

Accordingly, the present invention has an object to provide a novel organopolysiloxane compound capable of exhibiting a liquid-crystalline phase not only in an uncrosslinked condition but also in a crosslinked condition without the above described problems and disadvantages in the liquid-crystalline organopolysiloxanes in the prior art. Namely, the liquid-crystalline organopolysiloxane compound of the invention should be stable in a sealed condition even with the admixture of a catalyst for the crosslinking reaction, and be capable of being cured even at room temperature upon exposure to open atmosphere, and the cured material obtained by crosslinking the compound should be flexible and free from surface tackiness having excellent temperature characteristics, i.e. heat resitance and cold resistance.

Thus, the organopolysiloxane compound provided by the present invention is represented by the average unit formula

$$(R_1)_a(-Q-M-X)_b(G)_cSiO_{(4-a-b-c)/2}, \quad (I)$$

in which $R^1$ is an alkyl group having 1 to 4 carbon atoms or a phenyl group, Q is a group selected from the class consisting of alkylene groups having 2 to 18 carbon atoms and oxyalkylene groups having 2 to 18 carbon atoms, the oxygen atom or atoms being at the terminal of the alkyl group remote from the silicon atom or at an intermediate position of the alkylene group, M is a mesogen residue, X is an atom or a group selected from the class consisting of a nitrile group, trifluoromethyl group, fluorine atom, hydrogen atom, alkyl groups having 1 to 20 carbon atoms and alkoxy groups having 1 to 20 carbon atoms, G is a group represented by the general formula $-CH_2CH_2-(Y)_p-Si(R^2)_{3-n}(D)_n$, Y being selected from the class consisting of alkylene groups having 1 to 18 carbon atoms and divalent groups formed from at least one alkylene group and one or more ether linkages $-O-$ or ester linkages $-CO-O-$ or $-O-CO-$ having 1 to 18 carbon atoms and bonded to the silicon atom by the carbon atom in the alkylene group, $R^2$ being a group selected from the class consisting of alkyl groups having 1 to 20 carbon atoms, phenyl group and substituted phenyl groups, D being a hydrolyzable group, the subscript p being zero or 1 and the subscript n being 1, 2 or 3, the subscript a is a positive number in the range from 1 to 2, the subscript b is a positive number in the range from 0.2 to 0.99 and the subscript c is a positive number in the range from 0.8 to 0.01 with the proviso that $b+c$ does not exceed 1.

DETAILED DESCRIPTION OF THE PREFERRED EMBODIMENTS

Figure 1:
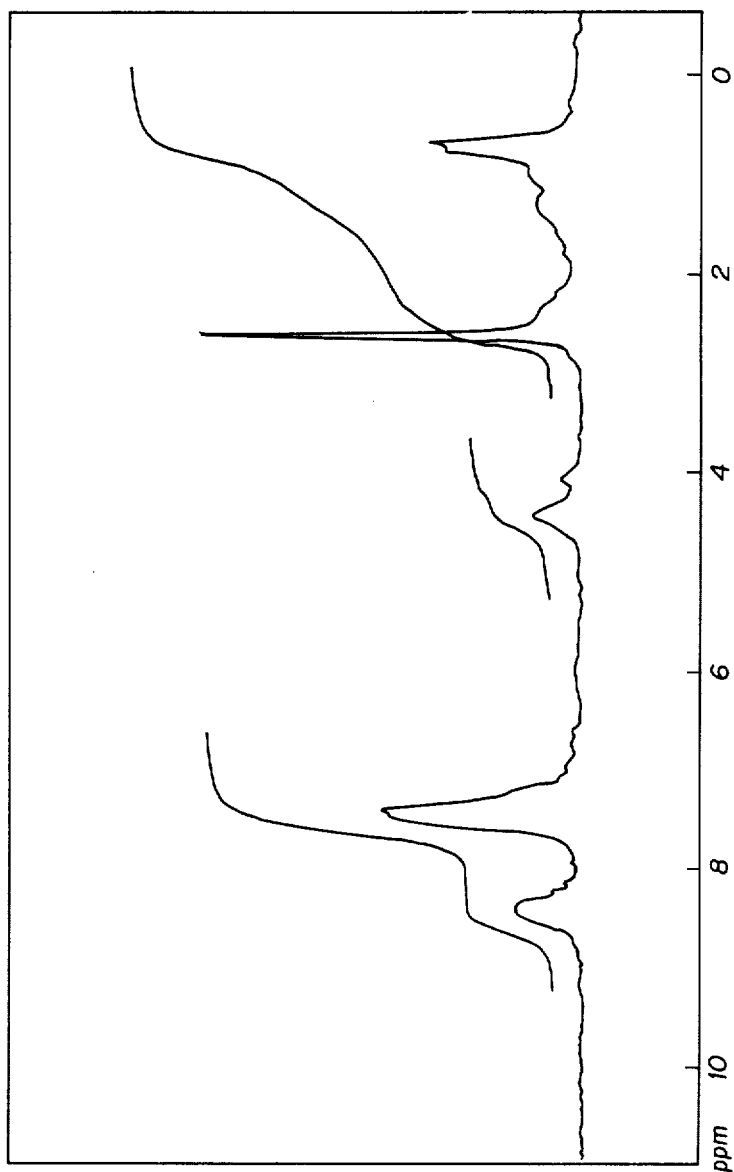
FIGS. 1 and 2 are each a diagram showing an NMR spectrum and an infrared absorption spectrum, respectively, of the organopolysiloxane prepared in Example 1.

In the average unit formula (I) representing the organopolysiloxane compound of the invention, the symbol $R^1$ denotes an alkyl group having 1 to 4 carbon atoms, i.e. methyl, ethyl, propyl or butyl group, or a phenyl group. It is optional that two kinds or more of these hydrocarbon groups are contained in the molecule of the organopolysiloxane. The symbol Q denotes a group selected from the class consisting of alkylene groups having 2 to 18 carbon atoms and oxyalkylene groups having 2 to 18 carbon atoms. The oxygen atom or each of the oxygen atoms in the oxyalkylene group can be at any position of the oxyalkylene group including the terminal of the alkylene group and any intermediate position of the alkylene group. It should be noted that the oxyalkylene group cannot be bonded to the silicon atom Si through the oxygen atom. Examples of the group denoted by Q include those expressed by the following structural formulas, to each of which the silicon atom is bonded at the left end: $+CH_2\overline{)_2}$; $+CH_2\overline{)_3}$; $+CH_2\overline{)_4}$; $+CH_2\overline{)_6}$; $+CH_2\overline{)_{12}}$; $+CH_2\overline{)_2}O-$; $+CH_2\overline{)_3}O+CH_2\overline{)_4}O-$; $+CH_2\overline{)_6}O-$; $+CH_2\overline{)_{12}}O-$; $+CH_2\overline{)_3}O+CH_2\overline{)_2}$; $+CH_2\overline{)_3}O+CH_2\overline{)_2}O-$; $+CH_2\overline{)_3}O+CH_2\overline{)_2}O+CH_2\overline{)_2}$; $+CH_2\overline{)_3}O+CH_2\overline{)_2}O+CH_2\overline{)_2}O-$ and the like.

The symbol M in the average unit formula (I) denotes a mesogenic group which can be a residue of any compound having mesogenicity. Examples of such a mesogenic compound include phenyl benzoate compounds, biphenyl compounds, phenyl cyclohexane carboxylates, cyclohexyl benzoates, cyclohexyl cyclohexane carboxylates, phenyl cyclohexane compounds, phenyl pyrimidine compounds, Schiff bases and the like. The symbol X denotes an atom or group selected from the class consisting of a nitrile group, trifluoromethyl group, fluorine atom, hydrogen atom, alkyl groups having 1 to 20 carbon atoms, e.g., methyl, ethyl and propyl groups, and alkoxy groups having 1 to 20 carbon atoms, e.g., methoxy, ethoxy and propoxy groups. Preferably, the atom or group denoted by X should have a large polarity in order to obtain a strong dielectrically anisotropic effect. In this regard, nitrile group, trifluoromethyl group and fluorine atom are preferred.

The symbol G in the formula (I) denotes a group represented by the general formula $-CH_2CH_2-(Y)_p-Si(R^2)_{3-n}(D)_n$. In this formula, Y is a group selected from the class consisting of alkylene groups having 1 to 18 carbon atoms and divalent groups formed of at least one alkylene group and one or more ether linkages —O— or ester linkages —CO—O— or —O—CO— having 1 to 18 carbon atoms and bonded to the silicon atom by the carbon atom in the alkylene group. Examples of the group denoted by Y include: $-CH_2-$; $+CH_2\overline{)_3}$; $+CH_2\overline{)_6}$; $-O+CH_2\overline{)_3}$; $-O+CH_2\overline{)_2}O+CH_2\overline{)_3}$; $-O+CH_2\overline{)_2}O+CH_2\overline{)_2}O+CH_2\overline{)_3}$; $-CH_2-O+CH_2\overline{)_3}$; $-CH_2-O+CH_2\overline{)_2}O+CH_2\overline{)_3}$; $-O+CH_2\overline{)_2}O+CH_2\overline{)_2}O+CH_2\overline{)_3}$; $-CO-O+CH_2\overline{)_2}$; $-CH_2-CO-O+CH_2\overline{)_3}$; $-CO-O+CH_2\overline{)_2}O+CH_2\overline{)_3}$; $-CO-O+CH_2\overline{)_3}(CH_2\overline{)_2}O+CH_2\overline{)_3}$; $-CH_2-O+CH_2\overline{)_3}$; $-CH_2-O+CH_2\overline{)_2}$; $-CH_2-O-CO+CH_2\overline{)_2}$; $-O-CO+CH_2\overline{)_2}$ and the like.

The symbol $R^2$ denotes a group selected from the class consisting of alkyl groups having 1 to 20 carbon atoms, e.g., methyl, ethyl and hexyl groups, phenyl group and substituted phenyl groups, e.g., o-, m- and p-tolyl groups and o-, m- and p-methoxyphenyl groups. The symbol D denotes a hydrolyzable atom or group such as halogen atoms, alkoxy groups, acyloxy groups, substituted aminoxy groups, oxime groups, iso-propenyloxy group and the like. The subscript p is zero or 1 and the subscript n is 1, 2 or 3.

The subscript a in the formula, which gives the number of the groups denoted by $R^1$ per silicon atom, is a number in the range from 1 to 2, when the value of a is too small, the excellent properties inherent in organopolysiloxanes may be lost, when it is too large, the organopolysiloxane cannot behave as a liquid crystal due to the decrease in the relative content of the mesogenic groups. The subscript b, which gives the number of the groups denoted by $(-Q-M-X)$ containing the mesogenic group M per silicon atom, is a number in the range from 0.2 to 0.99. When the value of b is too small, the organopolysiloxane cannot exhibit the properties as a liquid crystalline material while, when the value of b is too large, certain adverse influences are caused in the low temperature characteristics of the organopolysiloxane. The subscript c, which gives the number of the hydrolyzable groups denoted by G per silicon atom, is a number in the range from 0.01 to 0.8 with the proviso that $b+c$ does not exceed 1. When the value of c is too small, the density of crosslinks would be insufficient in the organopolysiloxane after curing while, when the value of c is too large, the organopolysiloxane after curing cannot exhibit a liquid crystalline phase due to the excessively high crosslinking density. When the value of $b+c$ exceeds 1, the critical temperature above which the organopolysiloxane exhibits a liquid crystalline phase, is increased.

The organopolysiloxane of the invention represented by the average unit formula (I) may have any molecular structure without particular limitations including linear, branched linear and cyclic structures. It is, however, preferable that the organopolysiloxane has a linear molecular structure represented by the general formula

$$E-SiMe_2-O+SiMeA-O)_{\overline{d}}$$
$$+(SiMeG-O)_e+SiMeR^1-O)_fSiMe_2-E, \quad (II)$$

in which Me is a methyl group, G and $R^1$ each have the same meaning as defined above, A is a group of —Q—M—X, E is a methyl group or A, the subscript d is zero or a positive integer not exceeding 300 but not zero when E is a methyl group, the subscript e is a positive integer not exceeding 90 and the subscript f is zero or a positive integer not exceeding 300 with the proviso that $d+e+f$ does not exceed 500. When the value of d is too large, the organopolysiloxane may be poor in the low temperature characteristics. When the value of e is too large, the crosslinking density in the organopolysiloxane after curing would be too high to fully exhibit the low temperature characteristics of the cured organopolysiloxane. When the value of f is too large, the organopolysiloxane cannot fully exhibit the liquid crystalline phase.

Particular examples of the organopolysiloxane compound represented by the average unit formula (I) include those compounds expressed by the following structural formulas, in which the symbols Me, Et, Ph, Pn and Cn denotes methyl, ethyl, phenyl, 1,4-phenylene and 1,4-cyclohexylene groups, respectively:

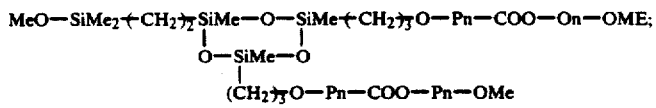

Me₃SiO—[SiMe[—(CH₂)₃O—Pn—COO—P-
n—F —O]₃₆.₁—[SiMe[—(CH₂)₂Si(OMe)₃]—O]₁.-
₉SiMe₃; Me₃SiO—[SiMe[—(CH₂)₃O—Pn—COO—P-
n—CN]—O]₃₅ —[SiMe[—(CH₂)₂SiMe(OMe)₂]—O]₂-
—(SiMeEt—O)₃SiMe₃; Me₃S-
iO—[SiMe[—(CH₂)₃O—CH₂)₂O—Pn—COO—Pn—C-
N]—O]₇₂—[SiMe[—(CH₂)₂SiMe(OMe)₂]—O]₄-
SiMe₂—O—SiMeEt—O—SiMe₃;
Me₃SiO—[SiMe[—(CH₂)₃O—Pn—Pn—CN]—O]₃-
₆—[SiMe[—(CH₂)₃O—(CH₂)₃Si(OMe)₃]—O]₃-
(SiMe₂—O)₃SiMe₃; Me₃SiO—[SiMe[—(CH₂)₃O—(CH₂-
)₂O—Pn—COO—Pn—CF₃]—O]₇₀ —[SiMe[—(CH₂-
)₃O—CO—(CH₂)₂Si(OMe)₃]—O]₃(SiMe₂—O)₂-
₃—SiMe₃; Me₃SiO—[SiMe[—(CH₂)₃O—(CH₂O—(CH₂-
)₂O—Pn—COO—Pn—F]—O]₉₀ —[SiMe[—(CH₂-
)₃O—CO—(CH₂)₂SiMe(OMe)₂]—O]₃-
SiMe₂—O—(—SiMeEt—O)₂₀(SiMePh—O)₃SiMe₃;
Me₃SiO—[SiMe[—(CH₂)₃O—Pn—COO—C-
n—OMe]—O]₁₃—[SiMe[—(CH₂)₂SiPh(OMe)₂]—O]₂-
(SiMePh—O)₃SiMe₃;
Me₃SiO—[SiMe[—(CH₂)₃O—(CH₂)₂O—(CH₂)₂O—Pn-
—COO—Pn—CN]—O]₁₁₀—[SiMe[—(CH₂)₃O—CH₂-
)₂O—CH₂)₂SiMe(OMe)₂]—O]₁₀SiMe₃; NC—Pn—P-
n—(CH₂)₃SiMe₂—O—[SiMe[—(CH₂)₃Pn—Pn—C-
N —O]₃₂ —[SiMe[—(CH₂)₆SiPh(OMe)₂]—O]₆-
SiMe₂—(CH₂)₃Pn—Pn—CN; F₃-
C—Pn—COO—Pn—O—(CH₂)₃SiMe₂—O—[-
SiMe[—(CH₂)₃O—Pn—O—CO—Pn—CF₃]—O]₁₀₆-
SiMe[—(CH₂)₆SiMe(OMe)₂]—O]₃(SiMe₂—O)-
₂—(SiMeEt—O)₃SiMe₂—(CH₂)₃O—Pn—O—CO—P-
n—CF₃; NC—Pn—Pn—O—(CH₂)₃SiMe₂—O—[SiM-
e[—(CH₂)₃O—Pn—Pn—CN]—O]₁₇—SiMe[—(CH₂-
)₃O—(CH₂)₂SiPh(OMe)₂]—O—SiMe₂—O—SiMe-
Ph—O—SiMe₂—(CH₂)₃O—Pn—Pn—CN; Me-
₃SiO—[SiMe[—(CH₂)₃O—Pn—COO—P-
n—OMe]—O]₇₅.₆—[SiMe[—(CH₂)₂Si(OMe)₃]—O]₈.₄-
(SiMe₂—O)₂₂—(SiMePh—O)₁₂SiMe₃; Me₃Si-
O—[SiMe[—(CH₂)₃O—Pn—COO—Pn—CN]—O]₃₆-
.₁—[SiMe[—(CH₂)₂Si(OMe)₃]—O]₁.₉SiMe₃;
NC—Pn—O—CO—Pn—O—(CH₂)₃SiMe₂—O—[S-
iMe[—(CH₂)₃O—Pn—COO—Pn—CN]—O]₁-
₇SiMe[—(CH₂)₃O—Si(OMe)₃]—O—SiMe₂—(CH₂-
)₃O—Pn—COO—Pn—CN; Me₃SiO—[SiMe[—(CH₂-
)₃O—(CH₂)₂O—Pn—COO—Pn—CN]—O]₃-
₄—[SiMe[—(CH₂)₂SiMe(OMe)₂]—O]₂(SiMe₂—O)₂-
SiMe₃; Among the compounds shown by the above given formulas, the compounds expressed by the last three formulas are particularly preferable.

The organopolysiloxane compound of the invention represented by the average unit formula (I) can be prepared, for example, by the following method. Thus, an organohydrogenpolysiloxane represented by the average unit formula $$(H)_{b+c}(R^1)_a SiO_{(4-a-b-c)/2},\qquad\text{(III)}$$

in which each symbol has the same meaning as defined before, is subjected to the hydrosilation reaction with a compound having a mesogenic group and a vinyl group represented by the general formula $$CH_2=CH-M-X,\qquad\text{(IV)}$$

or $$CH_2=CH-Z-M-X,\qquad\text{(IV')}$$

in which Z is an oxygen atom, alkylene group or an oxyalkylene group and each of the other symbols has the same meaning as defined before, and an organosilane compound having a vinyl group and a hydrolyzable group bonded to the silicon atom represented by the general formula $$CH_2=CH-(Y)_p-Si(R^2)_{3-b-c}(D)_{b+c},\qquad\text{(V)}$$

in which each symbol has the same meaning as defined before, in the presence of a catalyst.

The alkylene or oxyalkylene group denoted by Z in the above given general formula (IV') is exemplified by —CH₂—, —(CH₂)₂, —(CH₂)₄, —(CH₂)₁₀, —CH₂—O—, —(CH₂)₂O—, —(CH₂)₄O—, —(CH₂)₁₀O—, —CH₂—O—(CH₂)₂, —CH₂—O—(CH₂)₂O—, —CH₂—O—(CH₂)₂O—(CH₂)—, —CH₂—O—(CH₂)₂O—(CH₂)₂O— and the like.

Particular examples of the compounds represented by the general formula (IV) or (IV') include those compounds expressed by the following formulas, in which Py is a 2,5-pyrimidinylene group and each symbol other than Py has the same meaning as defined before:
CH₂=CHO—Pn—COO—Pn—X;
CH₂=CHCH₂O—Pn—COO—Pn—X;
CH₂=CHCH₂O—(CH₂)₂O—Pn—COO—Pn—X;
CH₂=CHCH₂O—(CH₂)₂O—(CH₂)₂O—Pn—COO—P-
n—X; CH₂=CHO—Pn—Pn—X; CH₂=CH—Pn—P-
n—X, CH₂=CHCH₂O—Pn—Pn—X;
CH₂=CHCH₂O—(CH₂)₂O—Pn—Pn—X;
CH₂=CHCH₂O—(CH₂)₂O—(CH₂)₂O—Pn—Pn—X;
CH₂=CHO—Cn—COO—Pn—X; CH₂=CH—C-
n—COO—Pn—X; CH₂=CHCH₂O—Cn—COO—P-
n—X; CH₂=CHCH₂O—(CH₂)₂O—Cn—COO—P-
n—X; CH₂=CHCH₂O—(CH₂)₂O—(CH₂)₂O—C-
n—COO—Pn—X; CH₂=CHCH₂O—Pn—COO—C-
n—X; CH₂=CHCH₂—Pn—COO—Cn—X;
CH₂=CHCH₂O—(CH₂)₂O—Pn—COO—Cn—X;
CH₂=CHCH₂O—(CH₂)₂O—(CH₂)₂O—Pn—COO—C-
n—X; CH₂=CHCH₂O—Cn—COO—Cn—X;
CH₂=CHCH₂—Cn—COO—Cn—X;
CH₂=CHCH₂O—(CH₂)₂O—Cn—COO—Cn—X;
CH₂=CHCH₂O—(CH₂)₂O—(CH₂)₂O—Cn—COO—C-
n—X; CH₂=CHCH₂O—Pn—Cn—X;
CH₂=CHCH₂—Pn—Cn—X; CH₂=CHCH₂O—(CH₂-
)₂O—Pn—Cn—X; CH₂=CHCH₂O—(CH₂)₂O—(CH₂-
)₂O—Pn—Cn—X; CH₂=CHCH₂O—Pn—Py—X;
CH₂=CHCH₂—Pn—Py—X; CH₂=CHCH₂O—(CH₂-
)₂O—Pn—Py—X; CH₂=CHCH₂O—(CH₂)₂O—(CH₂-
)₂O—Pn—Py—X; CH₂=CHCH₂O—Pn—CH=N—P-
n—X; CH₂=CHCH₂—Pn—CH=N—Pn—X;
CH₂=CHCH₂O—(CH₂)₂O—Pn—CH=N—Pn—X
and CH₂=CHCH₂O—(CH₂)₂O—(CH₂)₂O—Pn—CH-
=N—Pn—X.

Particular examples of the organosilane compound represented by the general formula (V) include those expressed by the following formulas, in which each symbol has the same meaning as defined before:
CH₂=CHSi(OMe)₃; CH₂=CHSiMe(OMe)₂;
CH₂=CHSiMe₂(OMe); CH₂=CHCH₂Si(OMe)₃;
CH₂=CHCH₂SiPh(OMe)₂; CH₂=CHCH₂SiPh-
₂(OMe); CH₂=CHCH₂SiMePh(OMe);
CH₂=CH—(CH₂)₄Si(OMe)₃; CH₂=CH—(CH₂)-
₄SiMe(OMe)₂; CH₂=CH—(CH₂)₆Si(OMe)₃;
CH₂=CH—(CH₂)₆SiMe(OMe)₂; CH₂=CH—(CH₂)-
₈Si(OMe)₃; CH₂=CH—(CH₂)₈SiMe(OMe)₂;
CH₂=CHCH₂O—(CH₂)₃Si(OMe)₃;
CH₂=CHCH₂O—(CH₂)₂O—(CH₂)₃SiMe(OMe)₂;
CH₂=CHCH₂O—(CH₂)₂O—(CH₂)₂O—(CH₂)₃SiMe₂-
(OMe); CH₂=CHCH₂CO—O—(CH₂)₃Si(OMe)₃;

$CH_2=CHCH_2-O-CO-(CH_2)_2Si(OMe)_3$; and
$CH_2=CHCH_2-O-CO-(CH_2)_2SiMe(OMe)_2$.

The reaction mixture for the above mentioned hydrosilation reaction should contain the compounds represented by the general formulas (IV) or (IV') and (V) in such amounts that the overall amount of the vinyl groups in these compounds is equimolar to the silicon-bonded hydrogen atoms in the organohydrogenpolysiloxane represented by the average unit formula (III). The reaction mixture can be admixed, if necessary, with a suitable organic solvent and the reaction is carried out at a temperature in the range from room temperature to 150° C. or, preferably, from 60° to 120° C. The catalyst to promote the hydrosilation reaction is usually a compound or complex of a noble metal, e.g., platinum, palladium and rhodium, such as platinum chloride $PtCl_4$, chloroplatinic acid $H_2PtCl_6.6H_2O$, platinum-ether complexes, platinum-olefin complexes and the like. The organic solvent, when added to the reaction mixture, is selected from aliphatic hydrocarbon solvents, aromatic hydrocarbon solvents and ethers such as hexane, benzene, toluene, xylene, diethyl ether, di-n-butyl ether, tetrahydrofuran and the like.

The organopolysiloxane compound of the invention represented by the average unit formula (I) can be crosslinked under relatively mild conditions in the presence of a condensation catalyst. For example, the organopolysiloxane is admixed with 0.1 to 10% by weight or, preferably, 0.2 to 5% by weight of a condensation catalyst together with or without an organic solvent and the mixture is kept standing at a temperature from room temperature to about 80° C. in an atmosphere of open air so that the hydrolyzable groups in the organopolysiloxane are hydrolyzed by the atmospheric moisture followed by the condensation reaction to form crosslinks. The condensation catalyst is not particularly limitative provided that the crosslinking reaction by the above mentioned mechanism can be promoted thereby including, for example, amine compounds such as triethanol amine, N-2-aminoethyl-3-aminopropyl trimethoxy silane and the like, metal salts of carboxylic acids such as zinc octoate, tin octoate and the like, organic tin compounds such as dibutyl tin octoate, dibutyl tin laurate and the like, titanate esters such as tetrabutyl titanate, tetrapropyl titanate and the like and chelate compounds of aluminum. These catalytic compounds can be used either singly or as a combination of two kinds or more according to need.

The inventive organopolysiloxane compound exhibiting a liquid crystalline phase is stable under hermetically sealed conditions even with an admixture of a condensation catalyst, but the organopolysiloxane compound admixed with a condensation catalyst is crosslinkable under relatively mild conditions to be converted into a cured solid having no surface tackiness. Thus, the crosslinked organopolysiloxane has flexibility and exhibits a liquid crystalline phase even at a temperature of room temperature or below so that the inventive organopolysiloxane compound is useful in various practical applications. For example, films prepared from the inventive organopolysiloxane compound can be used as materials in the fields of optoelectronics, temperature sensors, memory devices and the like.

In the following, the organopolysiloxane compound of the invention is described in more detail by way of examples.

EXAMPLE 1

Into a flask equipped with a reflux condenser, thermometer and stirrer were introduced 2.55 g of a methyl hydrogen polysiloxane expressed by the formula $Me_3Si-O+(SiMeH-O)_{38}SiMe_3$, 10 g of 4-fluorophenyl 4'-n-allyloxybenzoate, 0.23 g of vinyl trimethoxy silane and 30 g of toluene to form a reaction mixture which was agitated at 80° C. A drop of a 0.5% by weight solution of chloroplatinic acid in isopropyl alcohol was added to the reaction mixture which was further agitated for 30 minutes at the same temperature and then for an additional 3 hours by increasing the temperature to 110° C. to effect the hydrosilation reaction. After completion of the reaction, the reaction mixture was admixed with a large volume of methyl alcohol and the precipitates formed in the mixture were collected by filtration and dried under reduced pressure to give 10.9 g of a powdery product.

Figure 2:
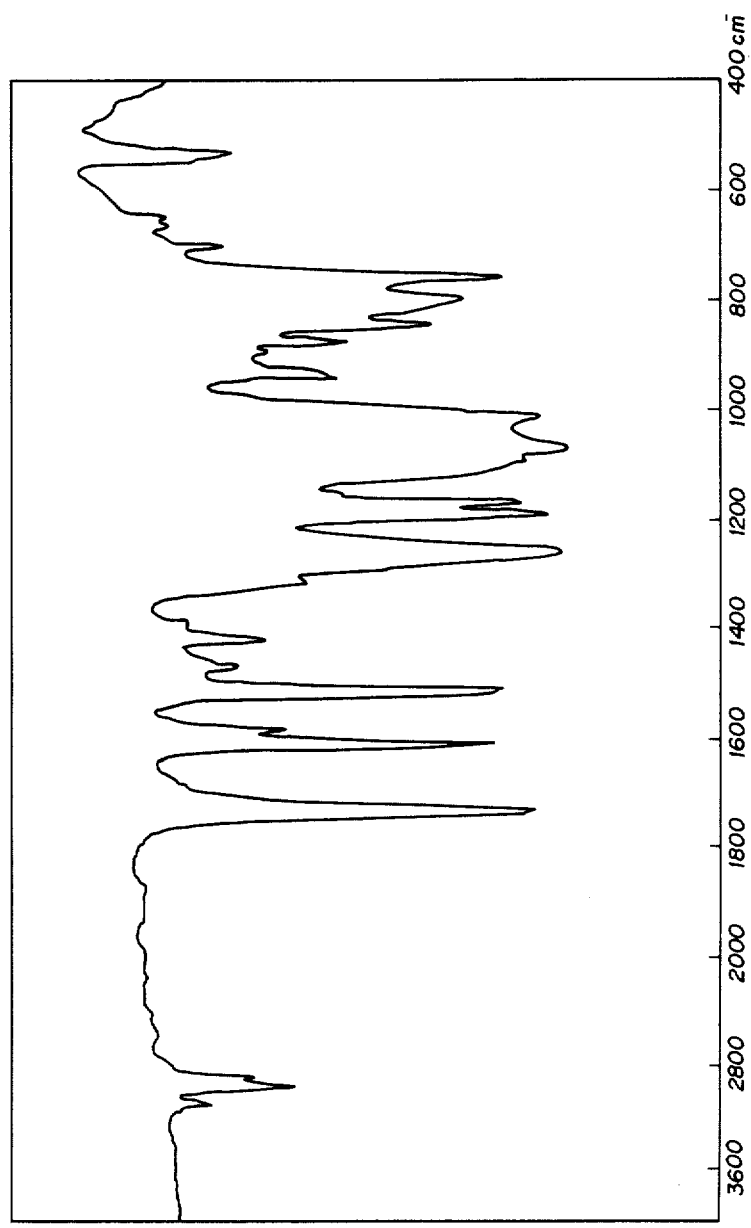

This product could be identified from the data of the $^1H$ NMR spectroscopy, of which FIG. 1 gives the diagram, and the infrared absorption spectrophotometry, of which FIG. 2 gives the diagram, shown below to be an organopolysiloxane compound expressed by the following structural formula: $Me_3SiO+[SiMe[+CH_2-]_3O-Pn-COO-Pn-F]-O+_{36.1}[SiMe[+CH_2]_3Si(OMe)_3]-O_{1.9}]SiMe_3$.

$^1H$ NMR ($CDCl_3$, acetone): δ, ppm; 8.3-8.7 (m, Ph); 6.6-7.5 (m, Ph); 3.8-4.3 (m, $OCH_3$); 3.6-3.8 (m, $OCH_3$); 1.8-2.3 (m, $CH_3$); 0.8-1.3 (m, $CH_2$); 0.8-0.1 (m, $SiCH_3$).

Infrared absorption spectrum: $cm^{-1}$; 2950; 1730; 1605; 1505; 1260; 1190; 1070.

A 1 g portion of the thus obtained organopolysiloxane was admixed with 0.05 g of tetrabutyl titanate and kept standing for 24 hours at room temperature to give a crosslinked organopolysiloxane. This crosslinked organopolysiloxane was subjected to an extraction test in a Soxhlet extractor using toluene as the extractant for 20 hours to find that the weight decrease of the organopolysiloxane by extraction was 3.8% by weight indicating fairly complete crosslinking.

The crosslinked organopolysiloxane was further examined by using a differential scanning calorimeter and a polarizing microscope to find a glass transition point of 260 K., phase transition temperature of 293 K. and decomposition at 473 K. or above without melting.

EXAMPLE 2

Into a flask equipped with a reflux condenser, thermometer and stirrer were introduced 3.97 g of a methyl phenyl hydrogen polysiloxane expressed by the formula $Me_3Si-O+(SiMeH-O)_{84}(SiMe_2-O)_{22}(SiMePh-O)_{13}SiMe_3$, 10 g of 4-methoxyphenyl 4'-allyloxybenzoate, 0.56 g of vinyl trimethoxy silane and 30 g of toluene to form a reaction mixture which was agitated at 80° C. A drop of a 0.5% by weight solution of chloroplatinic acid in isopropyl alcohol was added to the reaction mixture which was further agitated for 30 minutes at the same temperature and then for an additional 3 hours by increasing the temperature to 110° C. to effect the hydrosilation reaction. After completion of the reaction, the reaction mixture was admixed with a large volume of methyl alcohol and the precipitates formed in the mixture were collected by filtration and dried under reduced pressure to give 13.2 g of a powdery product.

Figure 3:
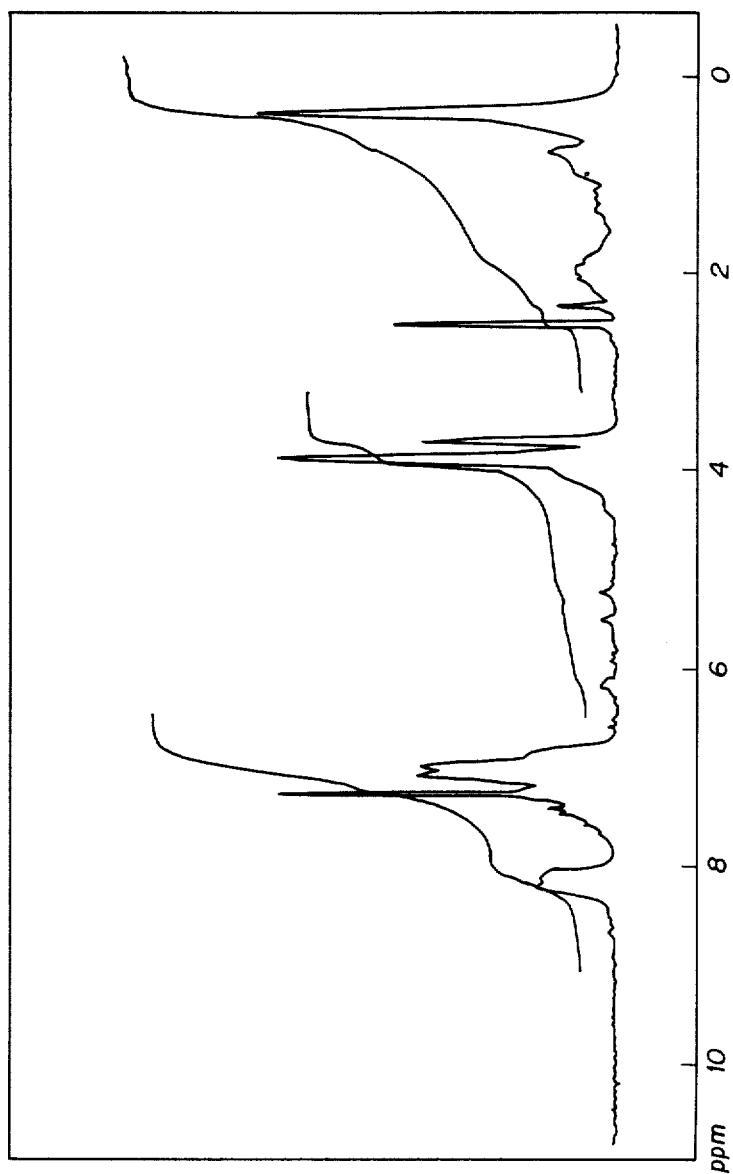
FIG. 3 is a diagram showing an NMR spectrum of the organopolysiloxane prepared in Example 2.

This product could be identified from the data of the $^1H$ NMR spectroscopy, of which FIG. 3 gives the diagram, and the infrared absorption spectrophotometry is shown below to be an organopolysiloxane compound expressed by the following structural formula:
Me₃SiO₂{SiMe[—(CH₂)₃O—Pn—COO—P-n—OMe]—O}₇₅.₆{SiMe[—(CH₂)₂Si(OMe)₃]—O}₈.₄-(SiMe₂—O)₂₂(SiMePh—O)₁₂SiMe₃.

$^1$H NMR (CDCl₃, acetone, toluene): δ, ppm; 7.9–8.4 (m); 6.7–7.8 (m); 3.6–4.3 (m); 1.3–2.3 (m); 0.7–1.1 (m); 0.1–0.7 (m)

Infrared absorption spectrum: cm$^{-1}$: 1735; 1600; 1505; 1240; 1060.

A 1 g portion of the thus obtained organopolysiloxane was admixed with 0.05 g of tetrabutyl titanate and kept standing for 24 hours at room temperature to give a crosslinked organopolysiloxane. This crosslinked organopolysiloxane was subjected to an extraction test in a Soxhlet extractor using toluene as the extractant for 20 hours to find that the weight decrease of the organopolysiloxane by extraction was 2.1% by weight indicating fairly complete crosslinking.

The crosslinked organopolysiloxane was further examined by using a differential scanning calorimeter and a polarizing microscope to find a glass transition point of 269 K. and decomposition at 523 K. or above without melting.

What is claimed is:

1. An organopolysiloxane compound represented by the average unit formula

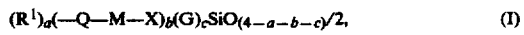

$$(R^1)_a(-Q-M-X)_b(G)_cSiO_{(4-a-b-c)/2}, \quad (I)$$

in which $R^1$ is an alkyl group having 1 to 4 carbon atoms or a phenyl group, Q is a group selected from the class consisting of alkylene groups having 2 to 18 carbon atoms and oxyalkylene groups having 2 to 18 carbon atoms, the oxygen atom or atoms being at the terminal of the alkyl group remote from the silicon atom or at an intermediate position of the alkylene group, M is a mesogen residue, X is an atom or a group selected from the class consisting of a nitrile group, trifluoromethyl group, fluorine atom, hydrogen atom, alkyl groups having 1 to 20 carbon atoms and alkoxy groups having 1 to 20 carbon atoms, G is a group represented by the general formula —CH₂CH₂—(Y)$_p$—Si(R²)$_{3-n}$(D)$_n$, Y being selected from the class consisting of alkylene groups having 1 to 18 carbon atoms and divalent groups formed of at least one alkylene group and one or more of ether linkages —O— or ester linkages —CO—O— or —O—CO— having 1 to 18 carbon atoms and bonded to the silicon atom by the carbon atom in the alkylene group, R² being a group selected from the class consisting of alkyl groups having 1 to 20 carbon atoms, phenyl group and substituted phenyl groups, D being a hydrolyzable group, the subscript p being zero or 1 and the subscript n being 1, 2 or 3, the subscript a is a positive number in the range from 1 to 2, the subscript b is a positive number in the range from 0.2 to 0.99 and the subscript c is a positive number in the range from 0.8 to 0.01 with the proviso that $b+c$ does not exceed 1.

2. The organopolysiloxane compound as claimed in claim 1 which has a linear molecular structure.

3. The organopolysiloxane compound as claimed in claim 2 which is represented by the general formula

$$E-SiMe_2-O\{SiMeA-O\}_d\{SiMeG-O\}_e\{SiMeR^1-O\}_fSiMe_2-E, \quad (II)$$

in which Me is a methyl group, A is a group —Q—M—X, E is a methyl group or A, the subscript d is zero or a positive integer not exceeding 300 but not zero when E is a methyl group, the subscript e is a positive integer not exceeding 90 and the subscript f is zero or a positive integer not exceeding 300 with the proviso that $d+e+f$ does not exceed 500.

4. The organopolysiloxane compound as claimed in claim 1 wherein the group denoted by —Q—M—X is selected from the class consisting of the groups expressed by the formulas: –(CH₂)₃O—Pn—CO—O—P-n—CN; –(CH₂)₃O—(CH₂)₃—O—Pn—CO—O—P-n—CN; –(CH₂)₃O—Pn—CO—O—Pn—F; and –(CH₂)₃O—Pn—CO—O—Pn—O—CH₃, in which the symbol Pn denotes a 1,4-phenylene group.

* * * * *